(12) United States Patent
Gupta et al.

(10) Patent No.: US 7,035,846 B2
(45) Date of Patent: Apr. 25, 2006

(54) METHODS, COMPUTER PROGRAMS AND APPARATUS FOR CACHING DIRECTORY QUERIES

(75) Inventors: Rajeev Gupta, New Delhi (IN); Apurva Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/252,662

(22) Filed: Sep. 23, 2002

(65) Prior Publication Data

US 2004/0059719 A1    Mar. 25, 2004

(51) Int. Cl.
*G06F 17/30* (2006.01)

(52) U.S. Cl. ............................... 707/3; 707/10

(58) Field of Classification Search ............... 707/1–6, 707/8, 10, 100–104.1, 200, 203; 709/200–203, 709/217–219, 223–229, 100–103; 715/500, 715/514
See application file for complete search history.

(56) References Cited

U.S. PATENT DOCUMENTS

| | | | |
|---|---|---|---|
| 6,345,266 B1 * | 2/2002 | Ganguly et al. ................ | 707/1 |
| 6,347,312 B1 | 2/2002 | Byrne et al. | |
| 6,633,878 B1 * | 10/2003 | Underwood ................ | 707/100 |
| 6,834,286 B1 * | 12/2004 | Srinivasan et al. ..... | 707/103 R |
| 2002/0133502 A1 * | 9/2002 | Rosenthal et al. | |

OTHER PUBLICATIONS

IETF Network Working Group's RFC 2251 "Lightweight Directory Access Protocol (v3)", Wahl, Howes & Kille, Dec. 1997, available from www.ietf.org/rfc/rfc2251.txt.

IETF Network Working Group's RFC 2252 "Lightweight Directory Access Protocol (v3): Attribute Syntax Definitions", Wahl, Coulbeck, Howes & Kille, Dec. 1997, available from www.ietf.org/rfc/rfc2252.txt.

Qiong Luo, Jeffrey F. Naughton, Rajasekar Krishnamurthy, Pei Cao, and Yunrui Li, "Active Query Caching for Database Web Servers", WebDB'2000: Third International Workshop on the Web and Databases, Dallas, Texas, May 18-19, 2000, in conjunction with ACM SIGMOD'2000.

Sophie Cluet, Olga Kapitskaia, and Divesh Srivastava, "Using LDAP Directory Caches", Proc. ACM PODS,1999.

(Continued)

*Primary Examiner*—John E. Breene
*Assistant Examiner*—Harold E. Dodds, Jr.
(74) *Attorney, Agent, or Firm*—Gibb I.P. Law Firm, LLC; T. Rao Coca, Esq.

(57) ABSTRACT

A framework for answering Lightweight Directory Access Protocol (LDAP) queries from previously cached queries includes a proxy server configured to receive client directory queries. The proxy server maintains a cache of data (entries) and semantic information associated with a query. In response to a query received from client, the proxy invokes a query containment procedure which uses the semantics of the incoming and stored queries to determine whether the query can be answered from cached queries. The proxy answers queries from the local cache when possible, and for other queries it sends the request to a directory server. The semantics of the new query and the resulting data (entries) are added to the cache. The method and apparatus can be used for positive conjunctive queries for answering equality, range and substring queries.

26 Claims, 5 Drawing Sheets

OTHER PUBLICATIONS

P A Larson and H Z Yang, "Computing Queries from Derived Relations", Proc. VLDB, 1987.

Olga Kapitskaia, Raymond T. Ng and Divesh Srivastava, "Evolution and revolutions in LDAP directory caches", Proceedings of the 7th International Conference on Extending Database Technology ("Advances in Database Technology EDBT 2000"), pp. 202-216, Konstanz, Germany, Mar. 27-31 2000, Lecture Notes in Computer Science, Springer 2000.

* cited by examiner

METHODS, COMPUTER PROGRAMS AND APPARATUS FOR CACHING DIRECTORY QUERIES

FIELD OF INVENTION

The present invention relates to methods, computer programs and apparatus for caching directory queries and answering directory queries from a cache.

BACKGROUND

There have been recent increases in Websites providing applications which access directories at the back end to carry out functions such as answering a client query, creating customized Webpages, or authentication. Directories are resource repositories which are organised to enable locating of records called directory entries.

The Lightweight Directory Access Protocol (LDAP) specification provides a software protocol for accessing and managing remote and possibly distributed directories. LDAP provides a search operation which allows users to query the directory for entries satisfying a search filter. LDAP servers were initially used as gateways to provide a TCP/IP interface to the X.500 directory server. As LDAP gained in popularity, the LDAP server ceased to be a front-end to the X.500 directory server and the directory itself became a part of the LDAP server. The current LDAP specification is the Internet Engineering Task Force (IETF) Network Working Group's Request for Comments (RFC) 2251, "Lightweight Directory Access Protocol (V.3)", Wahl, Howes & Kille, December 1997. At the time of writing, the LDAP specification and related specification RFC 2252, "Lightweight Directory Access Protocol (v3): Attribute Syntax Definitions", Wahl, Coulbeck, Howes & Kille, December 1997, is available from Website 'www.ietf.org'.

The data model of directories supports representation of heterogeneous real world entities in a single instance of the directory. LDAP directories are being used to store address books, contact information, customer profiles, network resource information, policies and other data files and resources.

To improve scalability and availability of directory based Web services, for the Internet and intranets, it is desirable to be able to cache results of LDAP directory queries and to use the cached results for answering future queries. However, unlike other Web content, individual resources (entries) within LDAP directories are not accessed directly but instead use LDAP queries. Therefore, techniques used for Web page caching cannot be used for LDAP resources. For an LDAP cache to answer a query, it needs to check whether the query is semantically contained in earlier queries.

Active query caching in databases is disclosed in Qiong Luo, Jeffery F. Naughton, Rajasekar Krishnamurthy, Pei Cao, and Yunrui Li, "Active Query Caching for Database Web Servers", WebDB 2000: Third International Workshop on the Web and Databases, Dallas, Tex., May 18–19, 2000, in conjunction with ACM SIGMOD'2000.

However, active proxy caching of database queries for Web applications is typically implemented by application-specific servlets running at the proxy, and this makes the solution application dependent.

U.S. Pat. No. 6,347,312 issued to Byrne et al for "Lightweight Directory Access Protocol (LDAP) directory server cache mechanism and method" describes a method of performing caching on an entry basis rather than a query basis. The approach of U.S. Pat. No. 6,347,312 does not check query containment, and so an incoming query is evaluated against the origin directory even if the query is contained in a stored query.

Sophie Cluet, Olga Kapitskaia and Divesh Srivastava in, "Using LDAP directory caches", Proceedings of the ACM Symposium on Principles of Database Systems (PODS), 1999, consider the problem of determining when a query can be soundly and completely answered. The authors consider various types of incoming queries and stored query templates and analyze the complexity of the problem of finding answerability. However, Cluet et al do not describe a solution for checking whether an incoming query contains or is contained within any of the stored queries.

P.-A. Larson and H. Z. Yang in "Computing queries from derived relations", Procs. of 11th VLDB, 1987, consider answering of database queries from derived relations, both represented as project-select-join (PSJ) expressions. They discuss algorithms for testing coverage and derivability of a PSJ expression by another PSJ expression. However, the stored condition expressions associated with the derived relations are not classified or indexed for easy lookup to find coverage. When a query comes, it is tested for coverage against all the derived relations. In applications where a large number of derived relations are stored in the cache, this approach is inefficient since an incoming query is tested against many derived relations which cannot possibly answer the query. Such a computation-intensive solution is not suitable for simpler LDAP queries.

Olga Kapitskaia, Raymond T. Ng and Divesh Srivastava in "Evolution and revolutions in LDAP directory caches", published in proceedings of the International Conference on Extending Database Technology (EDBT), 202–216, 2000 consider the problem of improving the hit-ratio of an LDAP directory cache by performing a cost benefit analysis of having a query template stored in the cache. The authors propose algorithms for determining whether it would be beneficial to have a query template in the cache. The authors, however, do not propose algorithms for determining whether an incoming query can be answered from stored queries.

There exists a need in the art for a caching solution for directory queries which can be used by different applications and directories. Independently, there also exists a need in the art for caching solutions which provide efficient checking of query containment when processing received queries.

SUMMARY

A first aspect of the present invention provides a method for processing directory queries in a directory service apparatus. In response to a directory service query being received by a proxy server of the directory service apparatus, characteristics of the received query are compared with query characteristics stored in cache storage at the proxy server. The stored query characteristics are representative of a set of directory queries for which results information is stored in the cache storage. This comparison identifies a subset of the set of cached queries which are potentially relevant to the received query. A determination is then made of whether any of the subset of cached queries contains the received query, in which case the received query can be answered using results information stored in the cache storage. If this determination is positive, the results information is retrieved from the cache storage and used to answer the received query.

In response to a determination that the received query is not contained within a directory query for which results information is stored in the cache, the received request is forwarded to a directory server of the directory service apparatus to answer the query.

The directory service apparatus is a computer or network of interconnected computers configured to provide a directory service in response to directory queries from client applications.

Preferably, the comparing step comprises the steps of: comparing characteristics of a received directory query with an index of query characteristics to identify a subset of the set of queries which are potentially relevant to the received query; and comparing the received directory query with the subset of potentially relevant queries to determine whether there exists a query within the cache which contains the received query. This is an efficient method for determining whether results information relevant to the received directory query is held in the local cache, since a fast index lookup operation is followed by a comparison with only a subset of the stored queries.

According to preferred embodiments of the invention, the compared query characteristics are attribute value assertions (AVAs) of the received query and attribute value assertions held in the proxy server's local cache storage.

The index is preferably an index of AVAs. A Boolean combination of AVAs is referred to hereafter as a filter. A filter defines the conditions that must be fulfilled for a query to match a given directory entry. A positive conjunctive filter is a set of AVAs combined by the AND operation. Most LDAP applications use only positive conjunctive queries, and so only positive conjunctive filters are used in a preferred embodiment of the invention for LDAP directories. In this embodiment, the index of AVAs is used for identifying a set of candidate filters held in the cache which have at least one matching AVA, and then the identified filters are compared with a Boolean expression representing the received query to determine whether any of the identified filters correspond to the filter of the received query. If the filter of the received query is contained in the cache, the relevant results information can be retrieved from the cache to answer the query.

In an alternative embodiment of the invention, the index of query characteristics is an index of filter names for the filters having results stored in the local cache.

A second aspect of the invention provides a data processing apparatus for providing a directory service, comprising an LDAP directory server and an LDAP proxy server connected to the LDAP directory server. The LDAP proxy server has a local cache storing query characteristics and results information for a set of directory queries. The LDAP proxy server implements a procedure for comparing characteristics of a received directory query with query characteristics held in the local cache to identify a subset of the set of cached directory queries which are potentially relevant to the received query. The next stage of the procedure then determines whether any of the subset of cached queries contains the received query, in which case the received query can be answered using results information stored in the cache storage. If this determination is positive, the results information is retrieved from the cache storage and used to answer the received query.

In a preferred embodiment of the invention, a software-implemented caching engine comprises an integral component of an LDAP server. This differs from known active query caching solutions for Web applications in which the caching engine is typically implemented by a servlet running at the proxy. Implementing the caching component as an integral component of the LDAP proxy server (i.e. at the middleware level) enables different applications and directories to use the caching facilities.

In a preferred embodiment of the invention, a directory service apparatus is configured such that directory requests from client applications are directed to a proxy server, and query characteristics and results information for a set of directory queries are stored in local cache storage of the proxy server. The query characteristics and results information held in the cache are updateable in response to a request being serviced by the directory server—adding new data (directory entries) and query characteristics to the cache and removing entries when required by storage constraints.

A further preferred embodiment of the invention implements a method for query containment of directory queries by maintaining indexes of attribute value assertions (AVAs) for query filters. The query containment method uses the semantic information in the stored queries to determine whether an incoming query can be answered. LDAP filters are very flexible and may contain any Boolean combination of simple predicates using AND, OR and NOT operations. However, most directory based applications use only conjunctive (AND) filters without negation. The method according to this embodiment of the invention provides an efficient means of performing query containment for positive conjunctive filters, using attribute value assertion (AVA) indexing of LDAP filters. By maintaining indexes of filters' AVAs, the problem of query containment is reduced to index lookups for the AVAs present in the filters of the incoming query and then taking the intersection of the set of results for stored filters satisfying individual AVAs.

Preferred embodiments of the invention efficiently answer directory queries from a cache using the semantic information contained in previously stored queries, and reuse various functionalities such as indexing, searching and various databases which are provided by existing directory servers. This makes the components implementing the present invention relatively easy to incorporate in a directory caching framework, such as an LDAP framework.

A particular implementation of the above-described method maintains indices for only a subset of filter attributes—the subset which appear only in equality assertions—to reduce the number of indexes to be maintained.

Methods according to the invention may be implemented as computer programs, and may be made available as program products comprising program code recorded on machine-readable recording medium.

BRIEF DESCRIPTION OF DRAWINGS

One or more preferred embodiments of the invention are described hereafter, by way of example only, with reference to the accompanying drawings in which.

DETAILED DESCRIPTION OF PREFERRED EMBODIMENTS

Figure 1:
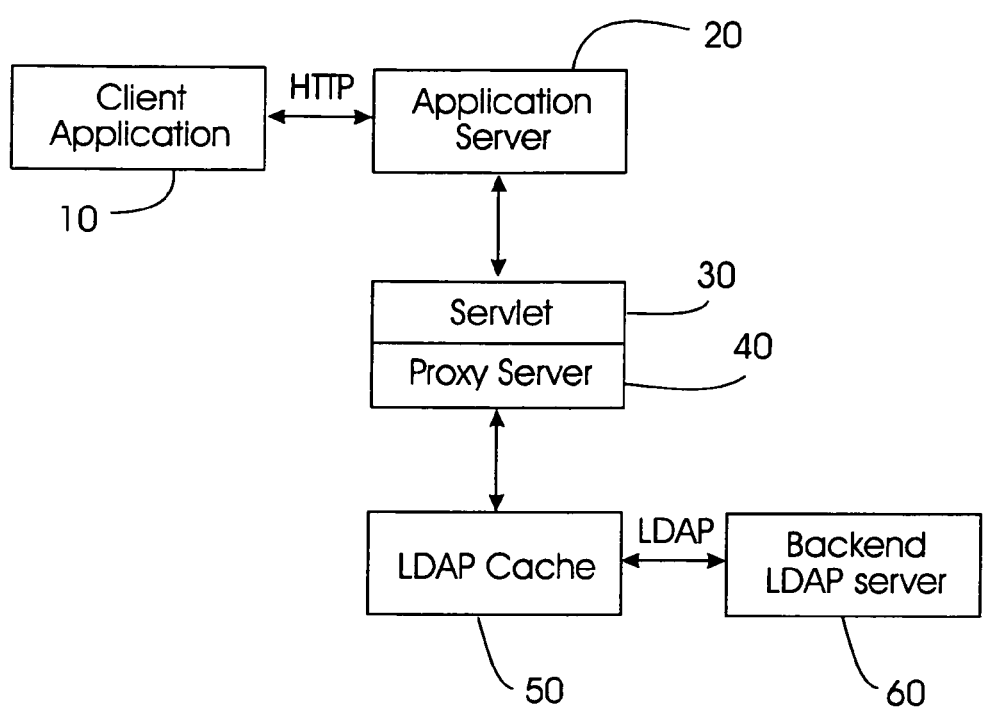
FIG. 1 is a schematic representation of a data processing network, showing a Web client application requesting directory services via an LDAP proxy server connected to a backend LDAP server, according to an example usage scenario for the present invention.

The following description includes method steps presented in terms of algorithms and symbolic representations of operations on data within a computer memory. Such algorithmic descriptions and representations are the means used by those skilled in the data processing arts to most effectively convey the substance of their work to others skilled in the art. An algorithm is a self-consistent sequence of steps leading to a desired result. The steps are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, it will be appreciated that throughout the present specification, terms such as "computing", "calculating", "determining", "comparing", "generating", "selecting", "outputting", or the like, refer to the action and processes of a computer system, or similar data processing device, that manipulates and transforms data represented as physical (electronic) quantities within the registers and memories of the device into other data similarly represented as physical quantities within device memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by one or more computer programs stored in the computer. The algorithms presented herein are not inherently related to any particular computer or other apparatus. Various general purpose machines may be used with programs in accordance with the teachings herein. Alternatively, the construction of more specialized apparatus to perform the required method steps may be appropriate.

For example, a computer or network of computers may be configured as an Internet Directory Service computing apparatus. The directory service apparatus may be configured to direct directory queries to a proxy server and to provide caching facilities within the proxy server—including a query containment solution which enables efficient answering of directory queries from a cache. The configuration steps include installing computer programs on the computing apparatus for performing the method steps described in detail below.

In addition, the present specification also discloses a computer readable medium having recorded thereon a computer program for performing the operations of the methods. The computer readable medium is taken herein to include any storage medium and any transmission medium for communicating the computer program between a source and a destination. The storage medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to use of caching for efficient answering of directory queries.

Described herein is a design of an LDAP caching framework. The framework builds on the LDAP proxy framework already provided by most LDAP servers. Also disclosed are methods for query containment, which reuse the functionalities present in the directory servers. The specific methods disclosed herein enable answering of equality, range and substring queries for conjunctive templates without negation. An implementation of the framework in the LDAP reference implementation server OpenLDAP is also described by way of example. At the time of writing, the guide "OpenLDAP 2.1 Administrator's Guide" is available on the Website 'www.openldap.org'.

Before describing the framework in detail, the following is an overview of the LDAP v3 protocol and definitions, to aid understanding of LDAP caching. LDAP can be explained in terms of two models:

LDAP Data Model

LDAP assumes the existence of one or more servers jointly providing access to a Directory Information Tree (DIT) which is made of entries. An entry is defined as a set of attribute value pairs. Entries have names: one or more attribute values from the entry form its relative distinguished name (RDN), which must be unique among all its siblings. The concatenation of the relative distinguished names of the sequence of entries from a particular entry to an immediate subordinate of the root of the tree forms that entry's Distinguished Name (DN), which is unique in the tree. Each entry must have an objectClass attribute. The objectClass attribute specifies the object classes of an entry, which along with the system and user schema determine the permitted attributes of an entry. The collection of entries mastered by a single server is called a naming context. The highest entry stored by a server is called a suffix.

A directory can have entries referring to other directories by pointing to their Uniform Resource Identifier (URI). Such referrals provide a means of distributing a directory across several servers.

A Schema is the collection of attribute type definitions and object class definitions. Subschema entries are used for administering information about the directory schema, in particular the object classes and attribute types supported by directory servers. A single subschema entry contains all schema definitions used by entries in a particular part of the directory tree.

An attribute is a type with one or more associated values. The attribute type is identified by a short descriptive name and an OID (object identifier). The attribute type governs whether there can be more than one value of an attribute of that type in an entry, the syntax to which the values must conform, the kinds of matching which can be performed on values of that attribute, and other functions.

The attribute types are described by sample values for the subschema "attributeTypes" attribute. An example of an attribute definition for type createTimestamp is given below:
(2.5.18.1 NAME 'createTimestamp' EQUALITY generalizedTimeMatch ORDERING generalizedTimeOrderingMatch
SYNTAX 1.3.6.1.4.1.1466.115.121.1.24
SINGLE-VALUE NO-USER-MODIFICATION USAGE directoryOperation)

LDAP Protocol Model

The general model adopted by the LDAP protocol is one of clients performing protocol operations against servers. In this model, a client transmits a protocol request describing the operation to be performed to a server. The server is then responsible for performing the necessary operation(s) in the directory. Upon completion of the operation(s), the server returns a response containing any results or errors to the requesting client.

LDAP defines three types of operations: query operations, such as search and compare, update operations such as add, modify, delete, modifyDN, and connect/disconnect operations such as bind, unbind and abandon. The most common operation is search which provides a very flexible means of accessing information from the directory.

The search request consists of the following main parameters:

Base: base object entry Distinguished Name relative to which the search is to be performed (i.e. the starting point for the search).

Scope: an indicator of the scope (or depth) of the search to be performed.

Filter: a filter that defines the conditions that must be fulfilled in order for the search to match a given entry. These conditions are specified as a set of attribute-value assertions (see below).

Attributes: a list of attributes requested from the matched entries.

LDAP Definitions

LDAP schema: A directory schema is a 4 tuple:
$S=(C, A, \rho, \alpha)$.

Where C is the set of object classes, A is the set of attribute types, $\rho$ and $\alpha$ are functions which associate a set of attribute types in A to a class in C such that
$\forall c \in C, \rho(c) \cap \alpha(c) = \Phi$ $\rho(c)$ represents the required attributes while $\alpha(c)$ represents the optional attributes in object class c.

The Distinguished Name (DN) associated with an entry is a sequence of sets of attribute value pairs. A directory instance consists of a set of distinguished names, directorynodes, which represents the nodes and determines the hierarchy in the directory.

The function dn2entry associates an entry with a distinguished name. An entry comprises a set of attribute value pairs.
dn2entry: directorynodes$\rightarrow 2^{\cup_{A1 \in A} A1 \: \backslash dom(A1)}$ dn2entry(dn) must satisfy the following requirements:

The attribute objectClass must be present (at least once) as one of the attributes in the set of attribute value pairs.

One particular attribute value pair in the distinguished name, the Relative Distinguished Name, is a member of the set.

The value for an attribute is of the correct type.

Filter: is a Boolean combination of simple predicates of the form (attribute <operator> value) employing and(&), or(|), not (!). The operator should be defined for the attribute type. The simple predicates are also called attribute value assertions (AVAs).

Solution Architecture

FIG. 1 shows an example usage scenario and network configuration, in which a Web client directory application 10 is requesting data items from a directory service via a servlet 30 and LDAP proxy server 50. An application server 20 receives HTTP requests sent by the client 10 and passes the requests to servlet 30 which makes LDAP queries corresponding to the HTTP requests. The servlet can use LDAP clients 40 such as the Java Naming and Directory Interface (JNDI) or C-APIs such as IBM's SDK, Netscape's SDK of the University of Michigan SDK. Query containment procedures are implemented in the LDAP cache block 50. Queries which cannot be answered by reference to the cache are passed on to the backend LDAP server 60.

Figure 2:
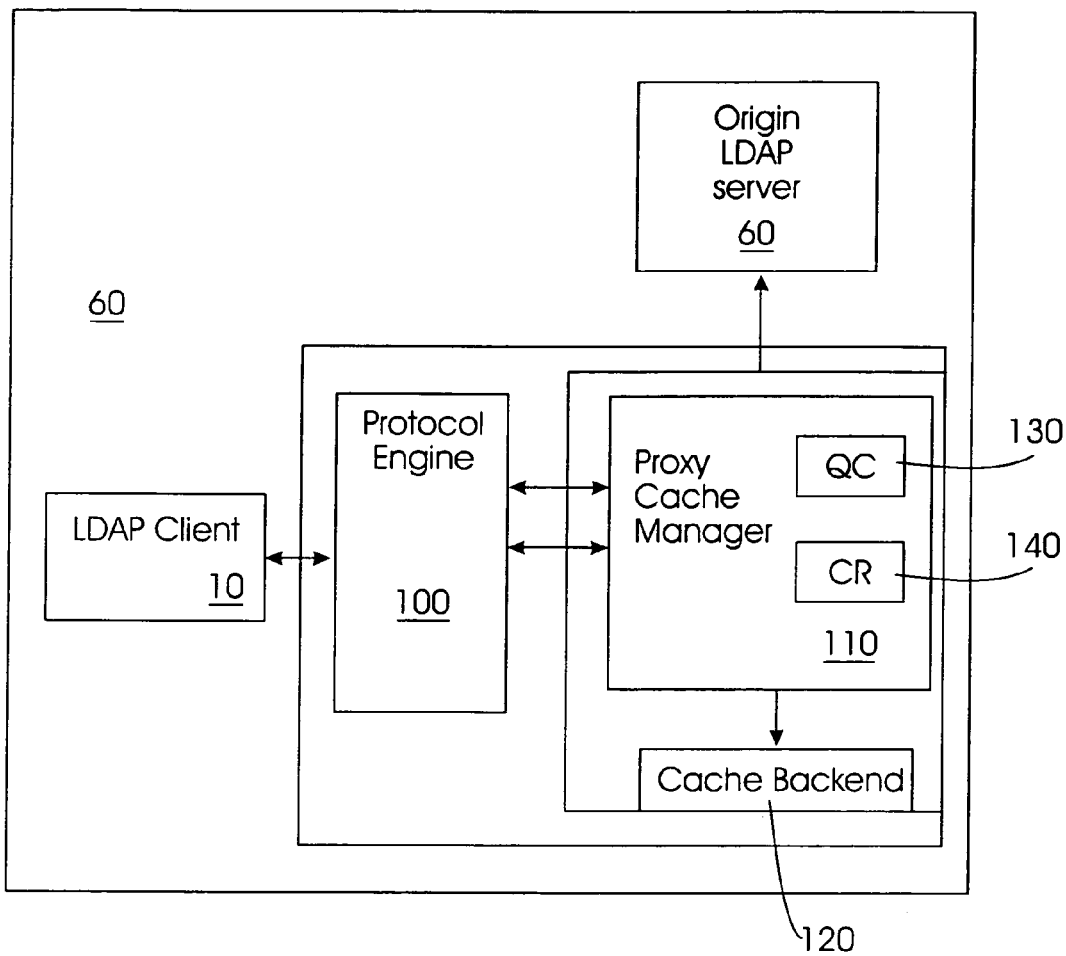
FIG. 2 is a schematic representation of a data processing network including an LDAP caching framework according to an embodiment of the invention.

FIG. 2 shows the LDAP caching framework. The framework comprises the following modules:

1. LDAP protocol engine 100: Provides the protocol funtionality of the LDAP server. Handles various LDAP operation requests. Passes the search operation requests to the cache manager 110.

2. Proxy cache manager 110: Answers the search request by either contacting the origin directory server 60 or the local cache backend 120. Implements query caching procedures via program components for query containment 130 and cache replacement 140. Stores the semantic information for the cached queries.

3. Cache Backend 120: Provides the cache manager with an interface to the local cache. Implements cache specific interfaces for merging results returned from remote server, removing queries, etc.

The protocol engine 100 forwards all requested operations to the proxy cache manager 110. The handling of a query by the cache manager is shown in the procedure handleQuery below (Procedure 1):

Protocol Engine (pe) procedures:
handle_operation: handles client operation requests.
send_search_result: sends search results to the client.

Cache Manager procedures:
handleQuery: this is the main procedure (shown below as Procedure 1), which handles a client query
query_containment: invokes a query containment procedure. Returns TRUE/FALSE depending upon whether a query for which it is called can be answered by the cached queries or not.
add_query: adds a query to the query cache.
remove_query: removes a query from the query cache.
cache_replace uses a cache replacement procedure to find the query to be removed from the cache.

Cache Backend (cache_be) procedures: The following interface procedure calls are shown in Procedure 1 below:
search: performs a local cache search, returns matching entries.
remove_query: removes entries belonging only to a particular query.
merge_query: this is called for each entry returned from the origin server for a query which could not be answered. If the entry is not present in the cache, the entry is created with attributes comprising the fetched attributes. Otherwise, those fetched attributes which are not present in the entry are added.

LDAP client API (ldap) procedures: The interface calls are shown in Procedure 1 below. There is a procedure for each LDAP operation.

Procedure 1

```
CacheManager: :handle Query (request) {
    operation = request operation
    if (operation != search)
        ldap operation(request, server)
        return
    if (query_containment (request) = TRUE)
        entries = cache_be search(request)
        pe send_entries(entries)
    else
        entries = ldap search(request,server)
        pe send_entries(entries)
        query = request query
        if (cache_size > hi_thresh)
            while (cache_size > lo_thresh)
                query1 = cache_replace( )
                cache_be remove_query (query1)
                    remove_query(query1)
            cache be merge query (query)
            add_query(query)
            return
}
```

Referring to FIG. 2, when a query Q is received, the cache manager 110 invokes a query containment component 130 to determine whether the query is answerable from the cache 120. If the cache has entries to answer Q, the relevant answers are retrieved from the local cache 120 and the cache manager 110 returns the query results to the protocol engine 100 for forwarding to the client application 10. Otherwise, the cache manager 110 binds with the remote LDAP server 60 and sends Q to the remote server 60. The results obtained from the remote server 60 are sent to the client application 10. The cache manager 110 adds these entries to the cached database 120. In case the cache size is more than a high-water-mark threshold, 'hi_thresh', the cache manager 110 calls for cache replacement, invoking the cache replacement component 140. This process is repeated until memory utilization is below a low-water-mark threshold, 'lo_thresh'. Once the entries have been added to the local cache, the cache manager 110 adds the query semantics to the query cache 120.

LDAP Caching Procedures

Some known query containment algorithms, such as disclosed in the papers referred to previously under the heading 'Background', can be used with the directory query caching framework described above. Implementation of such algorithms at the middleware level would provide the benefit of application independence described earlier. However the deficiencies of using these methods with respect to the preferred method have been discussed in 'Background'. Moreover, none of these previous works consider the problem of query containment for LDAP substring queries.

Described below are preferred methods and example procedures for checking query containment, which efficiently use the functionality provided by directory servers and provided by the caching framework.

Checking query containment for a directory service caching solution involves checking whether the cache contains results which are sufficient for answering the filter, $F_{incoming}$, of a received query. A simplification of this problem is to determine whether the results $R_1$ returned for any stored query i in the cache can be used to answer the filter $F_{incoming}$. This is referred to hereafter as determining whether an incoming query or query filter is contained in any of the stored queries or query filters. A query filter is a definition of the conditions that must be fulfilled for a directory entry to match the query.

A first containment method and procedure QC1, described in detail below, uses attribute value assertion (AVA) indices for filters to provide fast lookup during query containment checks. Most LDAP applications use only positive conjunctive queries. For this reason, only positive conjunctive filters are used in the procedures described below. Moreover, an assumption is made that all queries have the same base and subtree scope. This assumption is merely for simplification of the following description and is not a limitation of the invention.

Let us assume a set of attributes $A_1 \subseteq A$ which represents attributes which are used for searching the directory, i.e. which can appear in a filter. Another set $A_1 \subseteq A$ represents the attributes from A, for which substring matching is defined.

Definitions:

Attribute value assertion (AVA): is a three-tuple (a, operator, value), where $a \in A_F$, operator $\epsilon (=, >=, <=)$, and value $\epsilon$ dom(a).

Positive conjunctive filter (PCF): is a set of AVAs.

Filter template (FT): is a set of (attribute, operator) pairs. The template function maps a PCF to an FT:

template: set of all possible PCFs→set of all possible FTs such that for each AVA (a, op, v) in pcf, template (pcf) contains the tuple (a,op).

The set of filter templates is application dependent. Let us assume T as a finite set of allowed filter templates. Let us also assume F as the set of all possible filters, f, with templates(f)$\epsilon$T.

The two query containment procedures QC1 and QC2 described below and shown in FIGS. 3–5 make use of the following observation:

A conjunctive filter can be easily represented by a directory entry. Each attribute value assertion in the filter can be mapped to an attribute value pair of an entry. The operators can be incorporated by the entry having an attribute each for the upper and lower limit (a_le and a_ge) of the corresponding attribute, a, in the filter. (The mapped filter is not strictly an LDAP 'entry' because it does not satisfy the objectClass attribute requirement, but the term is used herein as a useful label). This method of representing filters is used in the method of FIG. 5 (and procedure QC2 below).

Just as queries can be answered quickly by maintaining attribute indices for entries, query containment can be made faster by maintaining attribute value assertion indices for stored conjunctive filters. Thus if indices are maintained for a_ge and a_le and all the attributes are indexed, then query containment can be achieved by using this indexing information. This technique is used in the method of FIGS. 3 and 4 (and procedure QC1 below).

Containment procedure based on AVA indexing (QC1)

Figure 3:
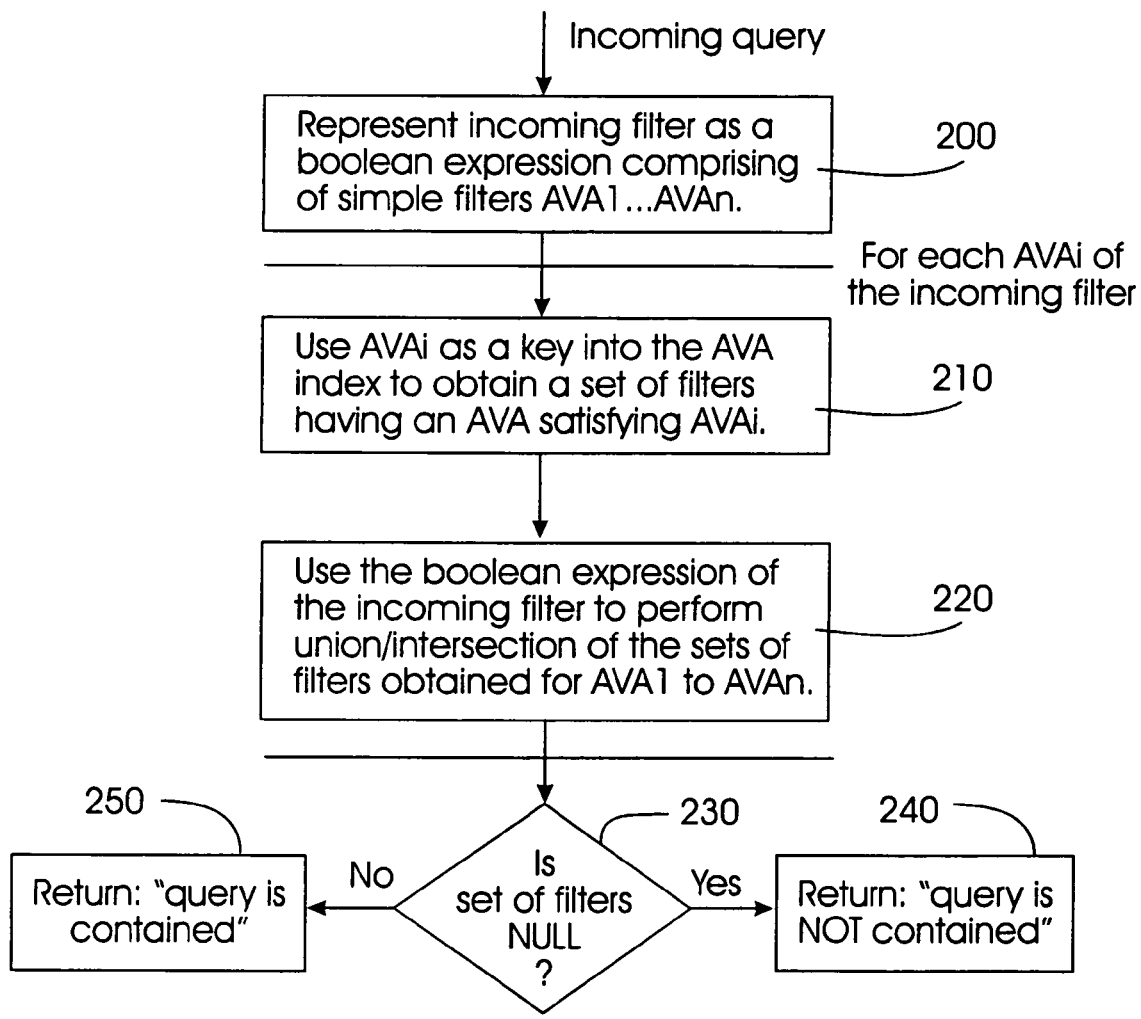
FIG. 3 shows a method for checking query containment according to an embodiment of the invention
Figure 4:
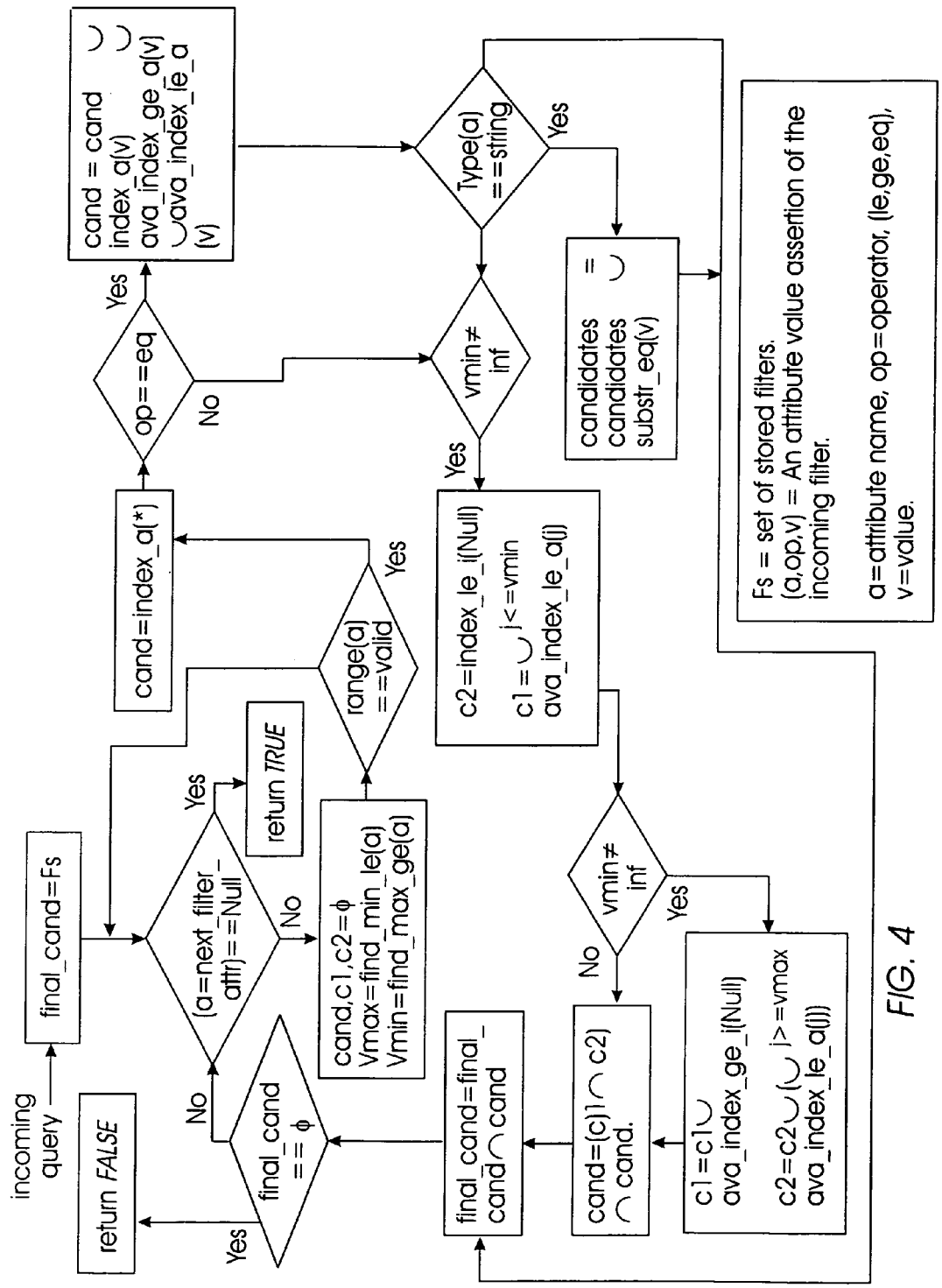
FIG. 4 is a flow diagram representation of an example procdure implementing FIG. 3.

The first method for containment checking is shown schematically in FIG. 3. When a directory query is received at the LDAP proxy, a Boolean expression is created 200 to represent the filter of the incoming query. This Boolean expression comprises a set of simple filters AVA1, AVA2, ..., AVAn combined using AND/OR. For each AVAi of the incoming filter (i=1, ..., n), the AVAi is used as a key into an AVA index held in the LDAP proxy's cache storage, to identify 210 a set of candidate filters having an AVA satisfying AVAi. The Boolean expression of the incoming filter is then used to perform union or intersection 220 of the sets of filters identified for all of AVA1 to AVAn (depending on whether the operator is AND or OR). The result of this step is identification of any filters within the cache which satisfy the Boolean expression. A determination is made 230 of whether the result is identification of one or more filters in the cache which satisfy the Boolean expression or a NULL result (i.e. no cached filters satisfy the expression). If the result is NULL, the containment procedure returns FALSE (or "query is not contained") 240 and then the incoming query is forwarded to the back end directory server.

However, if there is at least one cached filter which satisfies the complete query filter of the received query, the containment check procedure returns TRUE (or "query is contained") 250. In this case, the results for the relevant cached filter are retrieved from the cache and used to answer the original query.

A specific procedure QC1 for implementing the query containment method of FIG. 3 using AVA indexing is shown as FIG. 2 below and is represented as a flow diagram in FIG. 4.

Assumptions
1. The set AF is reasonably small (<10).
2. The domain of attribute types is finite.
3. The upper and lower limits of the attributes used in AVAs with >= or <= operators are known.

Three indices are maintained for each attribute $a_1$. The function ava_index_eq_i maps an AVA of the type ($a_1$=v) to a set of filters which have that AVA, i.e.

ava_index_eq_i: $dom(A_1) \rightarrow 2^F$.

where ava_index_eq_i(value)={fl(f $\in F_s$)$\wedge$(($a_1$,=, value)$\in$ f)} and F set of filters stored in the cache.

Similarly, ava_index_ge and ava_index_le are defined for AVAs with greater than or equal and less than or equal operators. Some special values for each of the three indices are also defined herein:

ava_index_eq_i(*) represents the set of filters with the presence filter ($a_1$=*).

ava_index_ge_i(NULL), represents filters which have an ($a_1$<=value) assertion but not an ($a_1$>=value) assertion.

ava_index_le_i(NULL), represents filters which have an (a >=value) assertion but not an ($a_1$<=value) assertion.

The following notational conveniences are used in the procedure QC1:

The variables "-inf" and "+inf" represent the upper and lower limits of the range attributes.

The operators >= and <= are overloaded to implement the correct ordering matching rule for the attribute.

The operators ++ and -- are overloaded to point to the next/previous value in the ava_index_ge_i and ava_index_ge_i indices.

The function find_min_le for a given attribute 'a' and a filter f returns the minimum value for assertions of the type (a<=value) in filter f. Returns a value +inf if no such assertion is found in f. Returns the value if an equality assertion of a is found.

The function find_max_ge for a given attribute 'a' for filter f returns the maximum value for assertions of the type (a>=value) in filter f. Returns a value -inf if no such assertion is found in f. Returns the value if an equality assertion of a is found.

Procedure QC1 is based on the following:

An equality assertion (a=v) can be satisfied by either of the following {(a=v),(a>=v),(a<=v),(a=*)}.

The pair of assertions (a>=vmin) & (a<=vmax) belonging to the same incoming filter can be answered by (c1∩c2)∪c3, where c1=(filters with (a>=v) assertion such that v<=vmin) ∪ (filters with a LE but not GE assertion).

c2=(filters with (a<=v) assertion such that v>=vmax) ∪ (filters with a GE but not LE assertion).

c3=(filters with (a=*) assertion).

Equality assertions containing attribute a $\in$ As are handled by the function substr_eq shown in Procedure 6. Substring assertions can be similarity handled by substr_str, shown in Procedure 5.

Procedure 2: QC1

```
Boolean QC1 (Filter f) {
    Set of Filters final_cand = Fs
    for each attribute a in A {
        Set of Filters candidates = φ
        Vmax = find_min_le (a,f)
        Vmin = find_max_ge (a,f)
        if(vmax=+inf& vmin=-inf)
            continue;
        candidates = ava_index_eq_i(*)
        if(op = eq) {
            candidates = candidates∪ava_index_eq_i(v)∪
                          ava_index_ge_i(v)∪ava_index_le_i(v)
            if(A ∈ As)
                candidates = candidates ∪ substr_eq(v)
        } else {
            j = -inf
            if (vmin ≠ -inf) {
                c2 = ava_index_le_i(NULL)
                while (j <= vmin)
                    c1 = c1 ∪ ava_index_ge_i(j)
                    j++
            }
            j = +inf
            if(vmax ≠ +inf) {
                c1 = c1 ∪ ava_index_ge_i(NULL)
                while (j >= vmax)
                    c2 = c2 ∪ ava_index_ge_i(j)
                    j--
            }
            candidates = (c1∩c2) ∪candidates
        }
        final_cand = final_cand∩candidates
        if (final_cand =φ)
            return FALSE }
        if final_cand≠φ
            return TRUE
        else
            return FALSE
    }
}
```

Containment Procedure Based on Filter Name Indexing (QC2)

Maintaining three indices each for all filter attributes is not an optimal solution for some implementations, if the set $A_F$ is large or if the domain of filter attributes is very large. In a method according to a second embodiment of the invention, described below together with a specific procedure QC2 for implementing the method, the concept of a filter name is defined. In this procedure only a single index on filter name is required.

Figure 5:
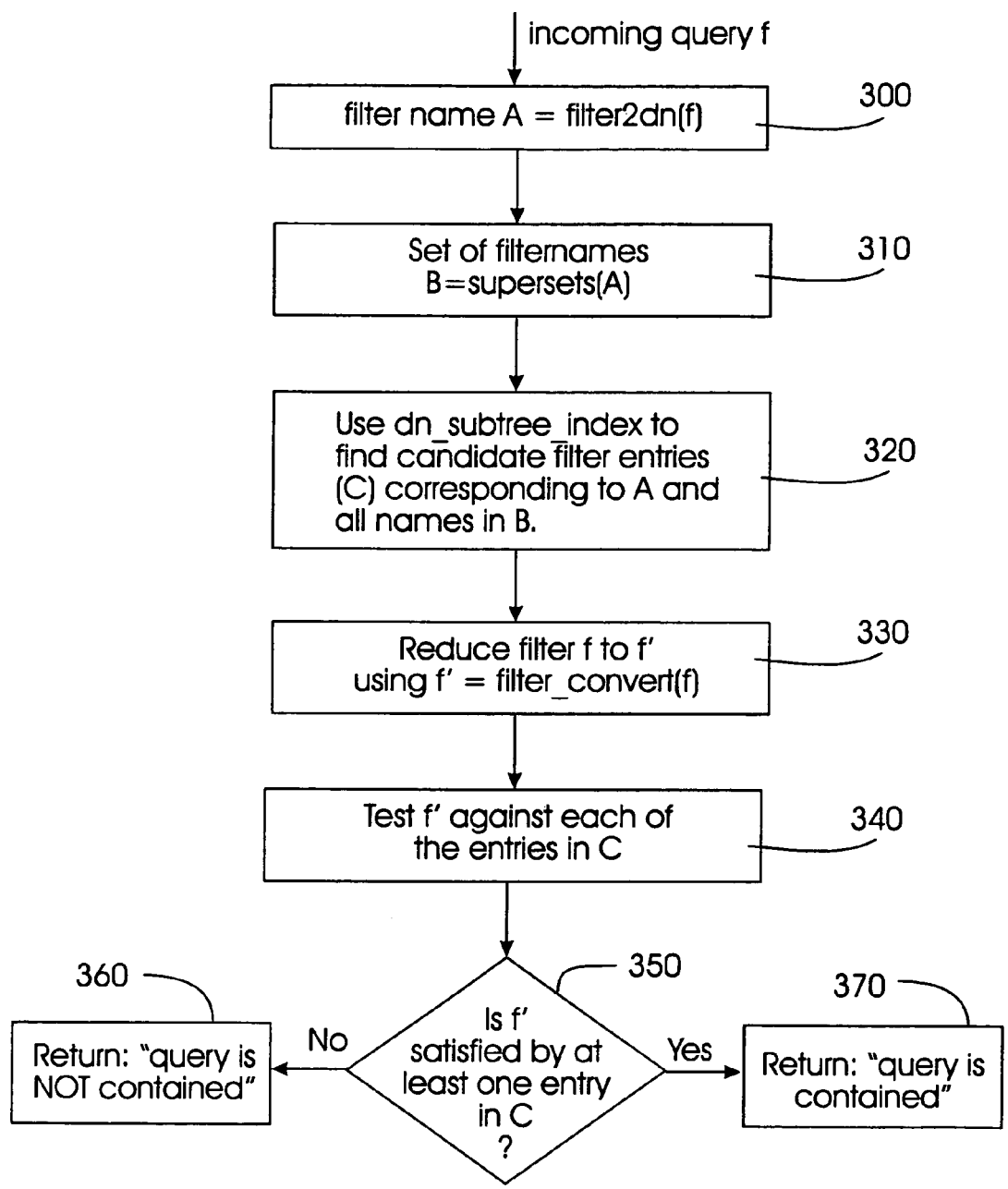
FIG. 5 shows a method for checking query containment using filter name indexing, according to a further embodiment of the invention.

FIG. 5 and Procedure 4 respectively show a method and specific procedure according to this second embodiment. Firstly, a filter name is derived 300, 310 from attributes of a received filter and then compared with a set of stored filter names 320 to identify candidate cached filters. The filter of the received query is then converted 330 so that it can be applied 340 to the filter entries. If it is determined 350 that any of these entries has attribute values satisfying the filter, the query is answered as contained 370. If none of the candidate entries has attribute values satisfying the incoming filter, this is reported 360 and the query is sent to the backend directory server.

The function filter2entry is the entry representation of a positive conjunctive filter, defined as follows:

filter2entry: $F \rightarrow 2^{\cup_{A_l \in A_1} * dom(A_1)}$

Given a filter f, for each attribute a in filter f, filter2entry (f) contains two attibute value pairs (a_le, find_min le(a,f)) and (a_ge, find_max_ge(a,f)).

The representation of a conjunctive filter as an entry can be used to address a group of filters by names, just like a group of entries can be referred to collectively by the DN of the base of the subtree to which the entry belongs. The name associated with a filter is a sequence of sets of attribute value pairs. The set of filter names corresponding to F is denoted by fname. Let attribute set $A' \subseteq A$ be the set of filter attributes which are used for filter names. Such attributes should have only equality matching rule defined.

A function filter2dn is defined as follows:

filter2dn: F→fname where filter2dn(f)={(a,v)|(a,=,v) ∈ f)∧(a ∈ A')} and the function dnsubtree_index:

dnsubtree_index: fname→$2^F$ which maps filter name to a set of filters such that:

dnSubtree_index(name)={f|filter2dn(f)=name ∧f ∈ F}

Also defined is a mapping between fname and a set of DNs which are obtained by replacing one or more attributes value pairs by a pair which corresponds to the presence filter (attribute=*). For a given fname this set of DNs can be used to look up 310 for filters which are candidates for answering a filter which maps to that fname.

superset: fname→set of dns superset(dn)={DN|DN=dn−{($a_1$,$v_1$). . . , ($a_n$, $v_n$)}+{($a_1$,*). . . , ($a_n$*) {for all possible subsets {($a_1$, $v_1$). . . ($a_n$, $v_n$)} of dn.

For example: For a given filter f=(&(a=x) (b=y) (c=*) (d>=k)) and A'={a, b, c}, fname=filter2dn(f) represents a=x, b=y, c=*. Also, f ∈ dnSubtree_index (fname) and superset (fname) represents the filters (&(a=x)(b=*)(c=*)), (&(a=*) (b=y)(c=*)), (&(a=*)(b=*)(c=*)).

The method of FIG. 5 and procedure QC2 shown in Procedure 4 involve indexing filters by maintaining a single index on filter name. The attributes A' are chosen such that they are contained in most of the filter templates. To add a filter to the cache, first its filter name is calculated using filter2dn. For the example above, the filter name is a=x, b=y, c=*. Then the filter is converted into an entry by stripping the filter attributes which belong to the set A' and using filter2entry function. An attribute called query_id is added to the filter with the value as ID of the query which brought that filter. If the query id for the query in example was id, then the entry version of the filter becomes, {(d_ge, k), (query_id, id)}.

An index for this entry is added in dnSubtree_index for the value (a=x, b=y, c=*,suffix) where suffix is the dn in the directory tree under which the entries representing filters are stored. The entry is then added with the dn as (query_id=id, a=x, b=y, c=*,suffix). The function add_query is shown in Procedure 3 below, and corresponds to the cache manager function add_query described previously.

Procedure 3

```
add_query (Filter f, id) {
    DN filterdn = filter2dn(f)
    filterdn = filterdn + suffix
    Filter new = convert_filter(f)
    Entry new_filter = filter2entry(new)
    add_attribute (new_filter, ▌ query_id▌ , id)
    dn_subtree_index_add(new_filter)
    dn2id_add(filterdn)         /* adds dn to id index */
    id2entry_add(new_filter)    /* adds entry */
}
```

Given that the filter entries are stored as above, the filter in the example above can only be answered by filter entries which are stored under the nodes (a=x, b=y, c=*,suffix), (a=x, b=*, c=*, suffix), (a=*, b=y, c=*, suffix), (a=*, b=*, c=*, suffix). Once this set of filter entries is known, they can be tested one by one by using test_filter against the remaining part of the incoming filter (d>=k).

Referring to FIG. 5, the sequence of steps in the method represented by procedure QC2 (Procedure 4 below) are as follows:

Step 1: In response to a query filter f being received, its filtername, A is obtained 300 using A=filter2dn(f). 'A' itself is a filter with equality assertions.

Step 2: B=supersets(A) 310 gives all distinct filter names which are obtained by substituting presence filters (attribute name=*) by replacing the 'value' in one or more attribute value equality assertions.

Step 3: A set of filter entries (stored as described in add_query), C, corresponding to filter names in B and the incoming filter name A are obtained 320 from the dn_subtree_index lookup.

Steps 4, 5: The incoming filter f, is then converted 330 using filter_convert so that it can be applied 340 to the filter entries to identify any of the candidate cached filters having attribute values satifying the incoming filter.

Step 6: If any of these entries has attribute values satisfying the filter, the query is answered as contained.

Procedure 4

```
Boolean QC2 (Filter f) {
    set of Filters   candidates = φ
    set of DNs       dnset
    DN               dn
    Entry            fil
    dn = filter2dn(f)
    if (dn ≠ NULL)
        candidates = dnSubtree_index(dn)
    dnset = supersets(dn)
    for each dn in dnset
        candidates = candidates ∪ dnSubtreeindex(dn)
    fq = filter_convert(f)
    for each entry fil in candidates
        if (test_filter(fq, fil)== TRUE)
            return TRUE
    return FALSE
}
Filter filter_convert (Filter filter) {
    Filter new = φ
    for each AVA (a.op.v) s t a∈A´ in filter
    if (op = eq)
        new = new∪{(a_ge,=,v), (a_le,=,v)}
    if (op = ge)
        new = new∪(a_ge,<=,v)
    if (op = le)
        new = new∪(a_le,>=,v)
```

```
        return new
}
```

As a specific example implementation, the following description illustrates the ease of implementation of the caching framework for the known reference OpenLDAP directory server. OpenLDAP is an open source implementation of an LDAP server. It mainly consists of standalone LDAP daemon (slapd) and stand-alone LDAP update replication daemon (slurpd). The slapd can run on different backend databases such as disk based embedded database LDBM, an interface to arbitrary shell scripts SHELL and password file database PASSWD. The slapd can be configured to serve multiple databases at the same time. OpenLDAP can support multiple database instances. To aid the reader, here is a brief overview of those parts of the OpenLDAP design which are relevant to the caching framework. The basic OpenLDAP structures are shown below.

Basic OpenLDAP structures:

```
BackendDB:
    struct BackendDB {
        BackendInfo        *bd_info,
        BerVarray           be_suffix,
        AccessControl      *be_mci,
        // other members
    }
BackendInfo
    struct BackendInfo {
        char*bi_type,          /* type of backend */
        BI_op_bind             *bi_op_bind,
        BI_op_unbind           *bi_op_unbind,
        BI_op_search           *bi_op_search,
        // members for other operations
    }
```

The BackendDB contains database instance specific information. The be_suffix member is the suffix of entries stored in the backend. The BackendInfo structure contains backend type specific information. It contains pointers to the backend specific implementation of functions for handling each of the LDAP operations. The following utility functions are provided common to all backends. test_filter(Filter*f, Entry*e): Tests whether an entry satisfies a given filter. Returns TRUE or FALSE. send_search_result Sends search results to the client. LDBM is a high-performance disk-based database. The LDBM database is designed to provide a highly functional system with good performance which is easy to administer and understand, and has reasonable reliability and recovery capabilities. Each entry is assigned a unique ID. All entries in the database are maintained in a single index file, keyed by this ID. Given an ID, the function id2entry( ) returns the corresponding entry can efficiently for the cost of a single hash table or btree lookup, depending on the choice of the underlying technology. Similarly, The DN to ID mapping is stored in a dn2id index, which is accessed through dn2id( ) function.

Cache Specific Extensions:

```
struct CacheBackendDB {
    Backend      c_backend,
    struct berval*      cache_be_suffix,
},
struct CacheBackendInfo {
    BackendInfo         b_info,
    char             *     bi_type,
    int (*cache_be_init)(BackendInfo* c),
    int (*cache_be_merge) (Backend* bd,
                Entry*entry, int query_id ),
    int (*cache_be_remove) (Backend*bd,
                int query_id).
    int (*cache_be_search) (Backend*bd,
                struct berval*nbase,int scope,
                Filter* filter, AttributeName      * attrs ),
},
```

The backend in OpenLDAP is extended to provide a cache backend with the cache specific interfaces. The structure CacheBackendDB contains instance specific cache backend information. The cache_be_suffix member is the suffix of all entries stored in the cache backend. CacheBackendInfo structure contains cache backend type specific information. It contains pointers to the backend specific implementation of the caching interfaces described under 'Solution Architecture' above with reference to Procedure 1. The mapping between the Cache Backend functions described under 'Solution Architecture' and these functions is given below:
cache_be.merge_query→cache_be_merge: to be called once for each entry of the query.
cache_be.remove_query→cache_be_remove.
Cache_be.search→cache_be_search.

The LDBM backend has been extended to provide implementation of the cache specific interfaces. The function ldbm_back_merge, provides an implementation of the cache_be_merge interface for LDBM backend. If the entry is already present, it adds any attributes which were not previously stored. Otherwise, it adds the entry to the database. A value representing the query ID of the query, for which the entry is being merged, is added for a cache specific operational attribute query_. The function ldap_back_rm_query implements the cache_be_remove interface. It provides functionality to remove entries having a particular query ID in their query_id attribute from the cache. The least recently used query is removed from the cache.

Answering Queries Using Substring Indices

Query containment involving substring filters is explained hereafter. Any substring filter predicate can be expressed as attribute=($\alpha_1$*$\alpha_a$[ ]*$\alpha_f$); where $\alpha_1$ is "initial" (prefix) string of the substring assertion, $\alpha_f$ is "final" (suffix) string of the substring assertion and $\alpha_a$[ ] is an array of "any" strings. This predicate will satisfy an entry if attribute value can be partitioned such that the specified substrings match different portions of the value in order of strings sequence ($\alpha_1$, $\alpha_a$[ ], $\alpha_f$) with $\alpha_1$ if present, is prefix of the value.
$\alpha_f$ if present, is suffix of the value.
Strings in $\alpha_a$[ ], if present, match some arbitrary portion of value in the sequence in which strings appear in $\alpha_a$[ ].

A stored substring filter can answer queries involving corresponding attribute's equality, substring and, to some extent, ordering predicates. Queries involving equality and substring predicates can be checked for query containment using substring indices. Indices are maintained for suffix and prefix of fixed length (say, index_len). Only those filters which do not have an "any" part in the substring assertion are stored. A NULL value index is maintained for both suffix and prefix values. A NULL value in suffix index will have filters having only "initial" substring value as their substring assertion. Similarly, a NULL value in prefix index will have filters having only "final" substring value as their substring assertion. Indexing functions index_suffix_i(v) and index_prefix_i(v) are defined as: index_suffix_i(value)={f|f ∈ FΛ($a_1$,=,*value)∈ f}.index_prefix_i,(value) {f|f ∈ FΛ($a_1$,=, value*)∈ f}.Function substr_eq(attribute. value) is used to check query containment of equality predicate, whereas substr_str(attribute, initial, final, any) is used to check query containment of substring predicate. In these functions value (n:m) is used to denote substring between $n^{th}$ and $m^{th}$ characters of value (both inclusive) and strlen(value) gives length of string.

Procedure 5

```
set of Filters substr_str (a₁, initial, final, any[ ]){
    C₁=φ, C₂=φ              /*FilterSets */
    if(strlen(initial) >= index_len) {
        /* find candidate filters with */
        /* same prefix or only suffix */
        ini_val=initial(1 index_len)
        C₁= index_prefix_i (ini_val)
            ∪ index_prefix_i (NULL)
    }
    if((strlen(final)=m) >= index_len){
        /* find candidate filters with * /
        /* same suffix or only prefix */
        fin_val=final(m- index_len +1 m)
        C₂=index_suffix_i (fin_val)
            ∪ index_suffix_i (NULL)
    }
    return C₁ ∩ C₂
}
```

Procedure 6

```
set of Filters substr_eq (attribute, value){
    F=φ                     /*FilterSet */
    ini_value=value(1 n)
    fin_value=value(m-n+1,m)
    if ((m=strlen(value)) >= 2n){
        /*Find filters with same prefix or*/
        /* suffix as 'value' or both*/
        F = (index_prefix_i(ini_val)
            ∪index_prefix_i(NULL))∩
            (index_suffix_i (fin_val)∪
            index_suffix_i(NULL))
    }else{
        /*Find filters with same prefix or */
        /* suffix as 'value' but not both*/
        F == (index_prefix_1(ini_val)∩
            index_suffix_1(NULL)∪
            (index_suffix_i(fin_val)∩
            index_prefix_1(NULL))
    }
    return F
}
```

What is claimed is:

1. A method for processing directory queries in a directory service apparatus, said method comprising:

in response to a directory service query being received by a proxy server of the directory service apparatus, comparing characteristics of the received query with query characteristics stored in cache storage at the proxy server, which stored information is representative of a set of directory queries for which results information is stored in said cache storage, thereby to identify a subset of the set of cached directory queries which are potentially relevant to the received query;

determining whether any of the subset of cached directory queries contains the received query;

in response to a positive determination that a cached directory query contains the received query, retrieving from said cache storage the results information corresponding to the containing cached directory query and answering the received query using the retrieved results information, wherein the compared query characteristics are attribute value assertions (AVAs) of the received query and attribute value assertions of the set of queries held in the cache storage of the proxy server, and wherein the proxy server comprises any of:
a reverse proxy located near the directory server or is a part of the directory server, and
a forward proxy located near a client system or is a cart of the client system.

2. The method according to claim 1, wherein, in response to a determination that no cached directory queries contain the received query, forwarding the received request to a directory server of the directory service apparatus to answer the query.

3. The method according to claim 1, wherein the comparing step comprises:

comparing characteristics of a received directory query with an index of query characteristics to identify the subset of the set of queries which are potentially relevant to the received query.

4. The method according to claim 1, wherein the step of determining whether any of the subset of directory queries contains the received query comprises comparing a filter defining the conditions required to satisfy the received query with filters corresponding to the subset of directory queries.

5. The method according to claim 3, wherein the index of query characteristics comprises an index of attribute value assertions (AVAs) for the set of queries held in the proxy server's cache storage.

6. The method according to claim 5, further comprising the steps of:

generating a Boolean expression of AVAs representing the received query;

and using each AVA within the Boolean expression as an input key for comparison with the index of AVAs to identify a subset of cached queries having an AVA which matches an AVA of the received query.

7. The method according to claim 6, wherein said step of determining whether any of the subset of cached directory queries contains the received query comprises using the Boolean expression representing the received query to perform an intersection operation on the AVAs within the subset of cached queries for each AND operator within the Boolean expression.

8. The method according to claim 6, wherein said step of determining whether any of the subset of cached directory queries contains the received query comprises using the Boolean expression representing the received query to perform a union operation on the AVAs within the subset of cached queries for each OR operator within the Boolean expression.

9. The method according to claim 3, wherein the index of query characteristics is an index of identifiers of filters having results stored in the local cache, wherein filters are definitions of the conditions which must be satisfied for a directory entry to match a query.

10. A method for processing directory queries in a directory service apparatus, said method comprising:
configuring a directory service apparatus such that directory requests from client applications are directed to a proxy server of the directory service apparatus;
storing, in cache storage of the proxy server, query characteristics and results information for a set of directory queries;
in response to a directory service query being received by a proxy server of the directory service apparatus, comparing characteristics of the received query with query characteristics stored in cache storage at the proxy server, which stored information is representative of a set of directory queries for which results information is stored in said cache storage, thereby to identify a subset of the set of cached directory queries which are potentially relevant to the received query;
determining whether any of the subset of cached directory queries contains the received query;
in response to a positive determination that a cached directory query contains the received query, retrieving from said cache storage the results information corresponding to the containing cached directory query and answering the received query using the retrieved results information,
wherein the compared query characteristics are attribute value assertions (AVAs) of the received query and attribute value assertions of the set of queries held in the cache storage of the proxy server, and
wherein the proxy server comprises any of:
a reverse proxy located near the directory server or is a part of the directory server, and
a forward proxy located near a client system or is apart of the client system.

11. A method for processing directory queries, said method comprising:
in response to receipt of a directory query, comparing characteristics of the received query with query characteristics stored in a cache of a proxy server, wherein the cached query characteristics are representative of a set of directory queries for which results information is stored in said cache, thereby to identify a subset of the set of cached directory queries which are potentially relevant to the received query;
determining whether any of the subset of cached directory queries contains the received query;
in response to a positive determination that a cached directory query contains the received query, retrieving from said cache the results information corresponding to the containing cached directory query and answering the received query using the retrieved results information,
wherein the compared query characteristics are attribute value assertions (AVAs) of the received query and attribute value assertions of the set of queries held in the cache storage of the proxy server, and
wherein the proxy server comprises any of;
a reverse proxy located near the directory server or is a part of the directory server, and
a forward proxy located near a client system or is a part of the client system.

12. A data processing apparatus for providing a directory service, said apparatus comprising:
an LDAP directory server;
an LDAP proxy server connected to the LDAP directory server, the LDAP proxy server comprising:
local cache storage, containing query characteristics and results information for a set of directory queries;
means, responsive to receipt of a directory query, for comparing characteristics of the received query with query characteristics stored in a cache, wherein the cached query characteristics are representative of a set of directory queries for which results information is stored in said cache, thereby to identify a subset of the set of cached directory queries which are potentially relevant to the received query;
means for determining whether any of the subset of cached directory queries 5 contains the received query; and
means, responsive to a positive determination that a cached directory query contains the received query, for retrieving from said cache the results information corresponding to the containing cached directory query and answering the received query using the retrieved results information,
wherein the compared query characteristics are attribute value assertions (AVAs) of the received query and attribute value assertions of the set of queries held in the cache storage of the proxy server, and
wherein the proxy server comprises any of;
a reverse proxy located near the directory server or is a part of the directory server, and
a forward proxy located near a client system or is a part of the client system.

13. A computer program product comprising program code recorded on a machine readable recording medium for controlling the operation of a data processing apparatus on which the program code executes, wherein the program code comprises:
means, responsive to receipt of a directory query, for comparing characteristics of the received query with query characteristics stored in a cache at a proxy server, wherein the cached query characteristics are representative of a set of directory queries for which results information is stored in said cache, thereby to identify a subset of the set of cached directory queries which are potentially relevant to the received query;
means for determining whether any of the subset of cached directory queries contains the received query; and
means, responsive to a positive determination that a cached directory query contains the received query, for retrieving from said cache the results information corresponding to the containing cached directory query and answering the received query using the retrieved results information,
wherein the compared query characteristics are attribute value assertions (AVAs) of the received query and attribute value assertions of the set of queries held in the cache storage of the proxy server, and
wherein the proxy server comprises any of;
a reverse proxy located near the directory server or is a part of the directory server, and
a forward proxy located near a client system or is a part of the client system.

14. A method for searching a directory using filter based search queries, wherein the directory comprises a directory server and a proxy server and is configured such that search queries are directed to the proxy server, said method comprising:

storing query semantics and search results returned by the directory server in cache storage of the proxy server;

in response to a received search query, searching the cache of said proxy server for a list of stored filters which are possible candidates for answering the query;

comparing the received search query with the candidate filters to determine whether all filters of the received search query are contained within the cache;

in response to a positive determination that the filters of the received search query are contained in the cache, retrieving the search results corresponding to the filters of the received search query from the cache, wherein the compared query characteristics are attribute value assertions (AVAs) of the received query and attribute value assertions of the set of queries held in the cache storage of the proxy server, and wherein the proxy server comprises any of:
a reverse proxy located near the directory server or is a part of the directory server, and
a forward proxy located near a client system or is a part of the client system.

15. The method according to claim 14, wherein the filter based search query is a Lightweight Directory Access Protocol (LDAP) query.

16. The method according to claim 14, where the cache storage is an integral component of an LDAP proxy server.

17. A method for checking query containment of queries, said method comprising:

storing indices in association with stored search filters, wherein the indices are derived from attribute value assertions of the stored search filters;

in response to a received search request, for each attribute value assertion present in the query, identifying by reference to the stored indices a set of stored search filters satisfying the attribute value assertion and comparing characteristics of the received search request with request characteristics stored in cache storage at a proxy server;

performing a union or intersection operation between the identified sets of filters corresponding to attribute value assertions of the received search request, depending upon the presence of OR or AND in the incoming query respectively; and returning a FALSE or TRUE depending upon whether the set of filters obtained after processing the incoming filter is a NULL set or not, wherein the compared query characteristics are attribute value assertions (AVAs) of the received query and attribute value assertions of the set of queries held in the cache storage of the proxy server, and wherein the proxy server comprises any of:
a reverse proxy located near the directory server or is a part of the directory server, and
a forward proxy located near a client system or is a part of the client system.

18. The method according to claim 17, wherein the filter based query is a Lightweight Directory Access Protocol (LDAP) query.

19. The method according to claim 17, wherein the incoming filter is a positive conjunctive LDAP search filter.

20. The method according to claim 17, wherein conjunctive LDAP filters are represented as entries with indexed attributes.

21. A method for checking query containment of directory queries, said method comprising:

maintaining an index providing a key for looking up filters having identical attribute value assertions for specified attributes;

storing the filter as a directory entry;

in response to a received search request, extracting the key from the search request and using it to lookup the set of filter entries comprising candidate filter entries for answering the request and comparing characteristics of the received search request characteristics stored in cache storage at a proxy server; and testing each of the filter entries with the requested query and returning TRUE if any of them satisfies the query, and FALSE otherwise, wherein the compared query characteristics are attribute value assertions (AVAs) of the received query and attribute value assertions of the set of queries held in the cache storage of the proxy server, and wherein the proxy server comprises any of:
a reverse proxy located near the directory server or is a part of the directory server, and
a forward proxy located near a client system or is a part of the client system.

22. The method according to claim 21, wherein the filter based query is a Lightweight Directory Access Protocol (LDAP) query.

23. The method according to claim 21, wherein the key is derived from attribute value assertions for equality assertions.

24. The method according to claim 21, wherein the entries representing filters are stored as part of the directory cache.

25. The method according to claim 21, wherein all entries representing filters with the same key value are child entries of the entry with distinguished name DN=(key, suffix) where suffix is the ancestor of all filter entries.

26. The method according to claim 21, wherein checking query containment of a received query is performed by first finding a distinguished name (DN) corresponding to the key extracted from the received query and performing an LDAP search using a filter from the received query as a search filter and using the DN as a base.

* * * * *